United States Patent
Bowen

[11] Patent Number: 5,269,355
[45] Date of Patent: Dec. 14, 1993

[54] CUTTING WHEEL FOR STUMP-GRINDING APPARATUS

[76] Inventor: Randal G. Bowen, 1503 Caddo School Rd., Joshua, Tex. 76058

[21] Appl. No.: 941,516

[22] Filed: Sep. 8, 1992

[51] Int. Cl.$^5$ .............................................. B27G 13/00
[52] U.S. Cl. .................................. 144/223; 83/676; 83/840; 83/848; 144/2 N; 144/218; 144/235; 144/241; 241/294; 299/89; 299/91
[58] Field of Search ............... 83/676, 640, 848; 144/2 N, 34 R, 176, 218, 223, 228, 231, 235, 237, 241; 241/294; 299/79, 89, 90, 91

[56] References Cited

U.S. PATENT DOCUMENTS

| | | | |
|---|---|---|---|
| 972,479 | 10/1910 | Sondergard | 144/228 |
| 1,405,614 | 2/1922 | Mitchell | 144/228 |
| 2,795,247 | 6/1957 | Topolinski | 83/848 |
| 3,570,566 | 3/1977 | McCreery | 144/2 |
| 3,911,979 | 10/1975 | Rousseau | 144/2 N |
| 4,530,385 | 7/1985 | York | 144/2 N |
| 4,621,668 | 11/1986 | York | 144/3 K |
| 4,681,145 | 7/1987 | York | 144/2 N |
| 4,697,625 | 10/1987 | Bolton | 144/2 N |
| 4,757,848 | 7/1988 | Mollberg, Jr. | 144/2 N |
| 4,827,995 | 5/1989 | Wilson | 144/2 N |
| 4,848,423 | 7/1989 | Yoder | 144/2 |
| 4,960,157 | 10/1990 | Sheets | 144/34 |
| 4,998,574 | 3/1991 | Beach et al. | 144/2 N |
| 5,034,407 | 7/1991 | Hooser | 144/2 |
| 5,070,920 | 12/1991 | Morey | 144/237 |
| 5,115,845 | 5/1992 | Hooser | 144/2 |
| 5,135,035 | 8/1992 | Mills | 144/2 N |

OTHER PUBLICATIONS

Parts Lists & Drawing, Levco Mfrs., Inc. Wynne, AR. (date unknown).
Product Brochure, Stumpmaster Australia Pty. Ltd (date unknown).
Product Brochure, Promark (date unknown).

*Primary Examiner*—W. Donald Bray
*Attorney, Agent, or Firm*—Robert A. Felsman; Mark D. Perdue

[57] ABSTRACT

A cutting wheel for use in a stump-grinding apparatus that has a reversible disk having an outer diameter. The disk has a generally noncircular hole through the center thereof to register with a correspondingly generally noncircular shaft for transmission of torque and rotation from the shaft to the disk. At least one cutting tooth having a leading cutting edge and a trailing cutting edge is secured to the outer diameter of the disk. The reversible disk may be removed from the generally noncircular shaft and subsequently reversed and replaced on the shaft, wherein the trailing cutting edge is transposed with the leading cutting edge.

10 Claims, 2 Drawing Sheets

CUTTING WHEEL FOR STUMP-GRINDING APPARATUS

BACKGROUND OF THE INVENTION

1. Field of the Invention

The present invention generally relates to apparatus for the grinding or disintegration of tree stumps. More specifically, the present invention relates to cutting wheels for use with such stump-grinding apparatus.

2. Description of the Prior Art

Stump-grinding apparatus of varying configuration has been used for a number of years to grind and disintegrate unsightly stumps that remain after a tree is felled. Such conventional stump-grinding apparatus usually is provided with a power end, which supplies power to a cutting end, which actually disintegrates the stump. Prior-art stump-grinding apparatus may be of a hand-held variety or of a walk-behind or stand-up variety.

Whether of the hand-held or walk-behind variety, conventional stump-grinding apparatus usually is provided with a cutting end comprising a shaft for rotation by the power end, and a cutting wheel having some form of cutting teeth, the cutting wheel secured to the shaft for rotation and disintegration of the stump. One prior-art hand-held stump-grinding apparatus, sold under the trade name "Grip 1000," has a cutting wheel having a plurality of fingers that extend radially from the center of the wheel and are provided at terminal ends thereof with carbide or hardmetal tips. Such a cutting wheel cuts in only one direction of rotation and cuts a relatively narrow kerf in the stump, wherein disintegration of the stump becomes time-consuming and expensive because only a relatively small volume of stump material is removed per revolution of the wheel.

Another prior-art stump grinding apparatus, sold by Levco, of Wynne, Arkansas, has a cutting wheel comprising a disk element secured to a tapered shaft by engagement with a correspondingly tapered hole in the disk element that is maintained by a flange secured to the wheel. A plurality of cutting tooth bosses are secured to the outer diameter of the disk element, and a cutting tooth having a pair of oppossed cutting edges is secured to each cutting tooth boss by a pair of bolts. Each cutting tooth may be removed from the cutting tooth boss and reversed, wherein the opposed cutting edges are transposed. Also, the cutting teeth are offset from each other, which permits the wheel to cut a wider kerf in the stump, increasing the material removal rate and decreasing the cutting time required to disintegrate a stump. However, because of the configuration of the cutting teeth, a trailing edge of each tooth strikes the stump immediately after the leading edge cuts the stump, leading to a rough and uneven cutting action.

A need exists, therefore, for an improved cutting wheel for stump-grinding apparatus that cuts a wide kerf in the stump and that provides the ability to expose a second set of cutting edges merely by removing the cutting wheel from the shaft and reversing it relative to the shaft.

SUMMARY OF THE INVENTION

It is a general object of the present invention to provide an improved cutting wheel for use in stump-grinding apparatus that may be reversed relative to a shaft of the apparatus to permit exposure of a second set of cutting edges, wherein the cutting life of the wheel is effectively doubled before resharpening is required.

This and other objects of the present invention are accomplished by providing a cutting wheel for use in a stump-grinding apparatus that has a reversible disk having an outer diameter. The disk has a generally noncircular hole through the center thereof to register with a correspondingly generally noncircular shaft for transmission of torque and rotation from the shaft to the disk. At least one cutting tooth having a leading cutting edge and a generally opposite trailing cutting edge is secured to the outer diameter of the disk. The reversible disk may be removed from the generally noncircular shaft and subsequently reversed and replaced on the shaft, wherein the trailing cutting edge is transposed with the leading cutting edge. Each cutting tooth is offset to permit the cutting wheel to cut a wider kerf.

According to a preferred embodiment of the present invention, at least one cutting tooth boss having a cutting tooth mounting surface is secured to the outer diameter of the disk and the cutting tooth is secured to the cutting tooth mounting surface of the boss. The cutting tooth mounting surface may be inclined wherein the leading cutting edge of the tooth is elevated relative to the trailing edge, wherein the tooth is provided with a pitch to smooth the cutting action of the cutting wheel. The disk is provided with lightening holes to reduce the mass of the cutting wheel and to dampen vibration of the cutting wheel.

Other objects, features and advantages of the present invention will become apparent to those skilled in the art with reference to the drawings and detailed description, which follow.

DESCRIPTION OF THE PREFERRED EMBODIMENT

Figure 1:
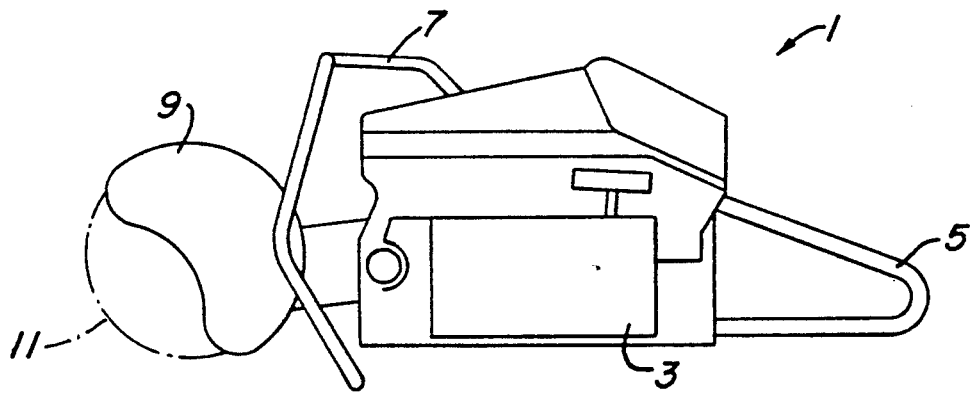
FIG. 1 is a perspective view of a hand-held stump-grinding apparatus as contemplated for use with the present invention.

Referring now to the Figures and specifically to FIG. 1, a perspective view of a hand-held stump-grinding apparatus 1 is illustrated. Stump-grinding apparatus 1 comprises a motor 3, a pair of handles 5,7, a shaft (not shown), a protective shroud 9, and a cutting wheel 11, shown in phantom line. Cutting wheel 11 is secured to the shaft for rotation by motor 3 to disintegrate stumps (not shown). Handles 5,7 are provided to ease manipulation of stump-grinding apparatus 1. Shroud 9 is provided to shield the user from flying chips of stump material produced during grinding of the stump.

Figure 2:
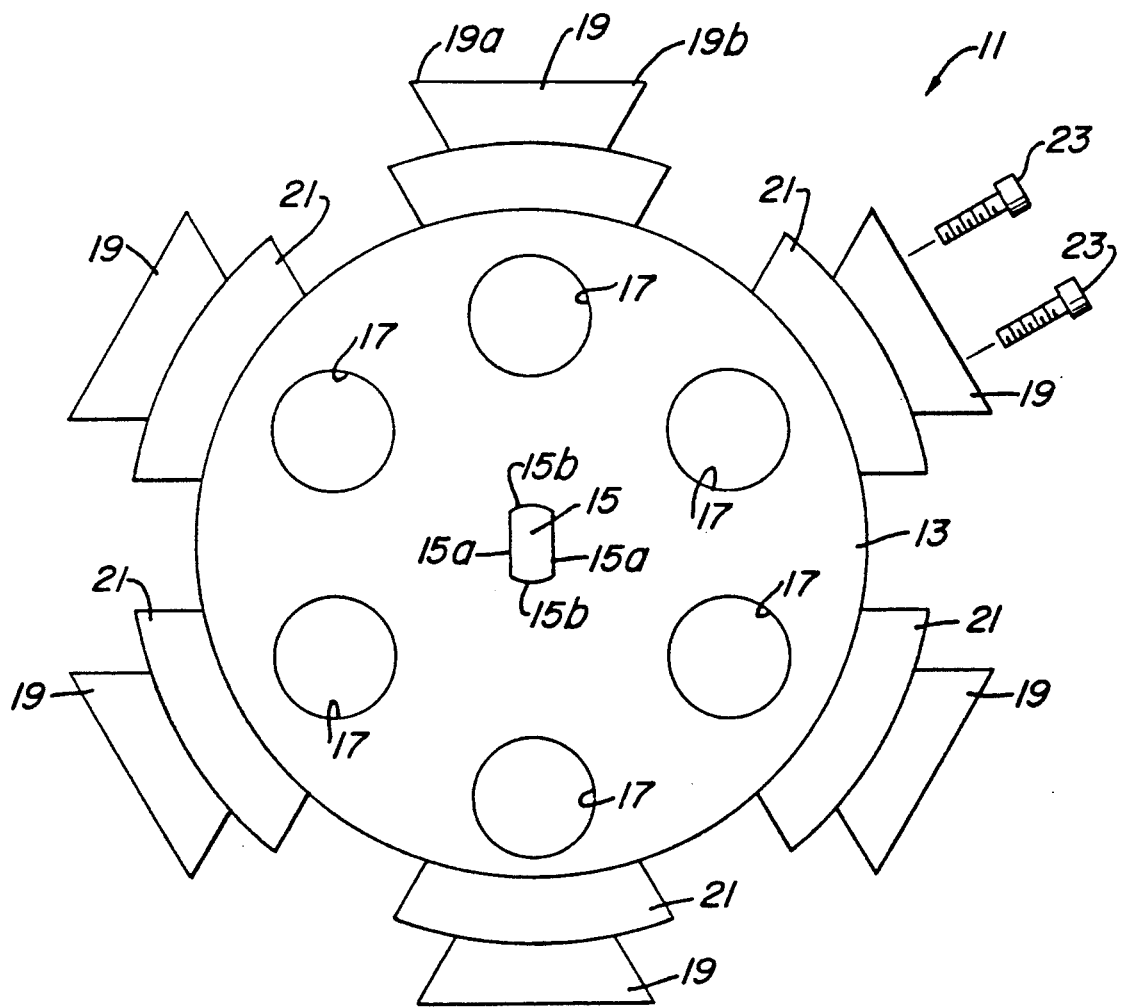
FIG. 2 is plan view of a cutting wheel according to the present invention.

FIG. 2 depicts a plan view of the cutting wheel 11 according to the present invention. Cutting wheel 11 includes a reversible disk 13. A generally noncircular hole 15 is formed through the center of reversible disk 13. According to a preferred embodiment of the present invention, generally noncircular hole 15 comprises a broached hole having a pair of opposing, parallel, generally planar surfaces 15a, which are connected by a pair of opposing, generally arcuate surfaces 15b. Generally, noncircular hole 15 is provided to secure cutting wheel 11 to a correspondingly shaped, generally noncircular shaft (not shown) of stump-grinding apparatus 1, to transfer torque and rotation from the shaft to wheel 11. Noncircular hole 15 need not be formed as illustrated, but should be formed to permit transmission of torque and rotation from the shaft and so that cutting wheel 11 may be secured to the shaft, removed from the shaft, reversed relative to the shaft, and replaced upon the shaft.

A plurality, in this case six, lightening holes 17 are circumferentially spaced through reversible disk 13 intermediate the center and the outer diameter thereof. Lightening holes are provided to reduce the mass of wheel 11, and to reduce its rigidity, wherein vibration of wheel 11 is damped in cutting operation.

At least one, in this case six, cutting tooth 19 is secured to the outer diameter of reversible disk 13. Each cutting tooth 19 is provided with a pair of generally opposite cutting edges 19a, 19b, which preferably are carbide-tipped. Each of the pair of cutting edges 19a, 19b defines a leading cutting edge and a trailing cutting edge, dependent upon the direction of rotation of cutting wheel 11. As an example, if wheel 11 is rotated in a counter-clockwise direction, cutting edge 19a is a leading cutting edge, and cutting edge 19b is a trailing cutting edge that is not arranged for cutting engagement with the stump to be ground. The converse is true if the direction of rotation of cutting wheel 11 is reversed.

Preferably, at least one, in this case six, cutting tooth boss 12 is secured between the outer diameter of disk 13 and each cutting tooth 19. In the preferred embodiment, cutting tooth bosses 21 are welded to the outer diameter of disk 13, and cutting teeth 19 are secured to bosses 21 by a pair of bolts 23. Cutting tooth bosses 21 increase the protrusion of teeth 19 from disk, and provide a wider, heavier section to drill and tap to receive bolts 23. Those skilled in the art will appreciate that lightening holes 17, cutting teeth 19, and cutting tooth bosses must be located on disk 13 with care to insure that cutting wheel is balanced for smooth rotation in operation.

Figure 3:
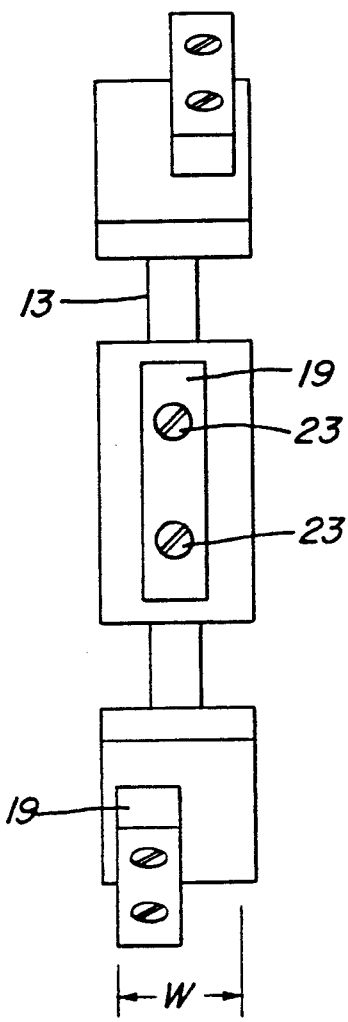
FIG. 3 is an edge, elevation view of the cutting wheel of FIG. 2.

FIG. 3 depicts an edge, elevation view of cutting wheel 11 of FIG. 2. The offset of cutting teeth 19 and cutting tooth bosses 21 is illustrated. A first cutting tooth 19 and cutting tooth boss 21 is aligned with a central plane of disk 13. A second and adjacent cutting tooth 19 and cutting tooth boss 21 is offset relative to the first by alignment to one side of the central plane normal to the axis of rotation of disk 13. A third and adjacent cutting tooth 19 and cutting tooth boss 21 is offset relative to the first by alignment to another and opposite side of the central plane of disk 13. Thus, provision of the cutting teeth 19 and cutting tooth bosses 21 with an offset increases a width W of the kerf that is cut by cutting wheel 11. According to a preferred embodiment of the present invention, disk 13 is ⅜ inch in width and 6 inches in diameter. Cutting teeth 19 and cutting tooth bosses 21 are ⅝ and ⅞ inch in width respectively, and are offset from the central plane of disk 13 an amount sufficient to define width W of 1¾ inch.

Figure 4:
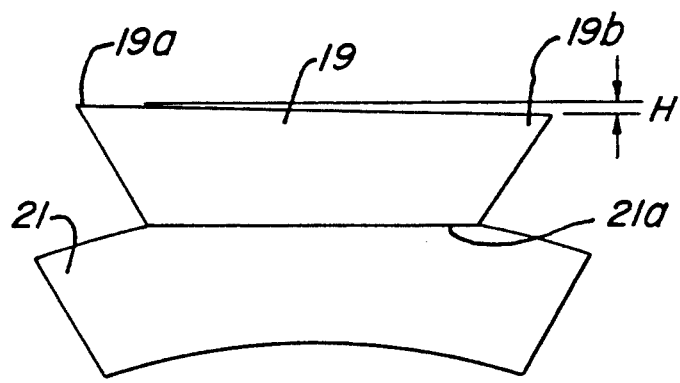
FIG. 4 is a plan view of a cutting tooth boss according to an embodiment of the cutting wheel of the present invention.

FIG. 4 illustrates cutting tooth 19 and cutting tooth boss 21 in enlarged elevation view. In the embodiment illustrated, an inclined cutting tooth mounting surface 21a is formed on an upper extent of cutting tooth boss 21. As is illustrated, upon securement of cutting tooth 19 on cutting tooth mounting surface 21a, leading cutting edge 19a is elevated an amount h relative to trailing cutting edge 19b in a counter-clockwise direction of rotation. Preferably, h is ⅛ inch. The elevation of one cutting edge relative to another provides cutting tooth 19 with a pitch, which prevents the trailing cutting edge from uselessly striking the stump after the leading cutting edge has cut the stump. Provision of cutting tooth 19 with a pitch permits smoother cutting operation of cutting wheel 11 according to the present invention, which results in a more easily manipulated stump-grinding apparatus that more efficiently uses cutting energy.

Those skilled in the art will appreciate that the pitch only has utility in one cutting direction of rotation of wheel 11. Pitch may be retained in a second cutting direction of rotation of wheel 11 by removal of tooth 19 from its cutting tooth boss 21, and reversal and replacement thereon.

With reference to FIGS. 1 through 4, the operation of cutting wheel 11 according to the present invention will be discussed. Cutting wheel 11 is secured to the shaft of stump-grinding apparatus 1. The stump to be ground or disintegrated is prepared by removing debris from the area that might be thrown if engaged by rotating cutting wheel 11. Motor 3 of stump-grinding apparatus 1 is started, which commences rotation of cutting wheel 11.

Stump-grinding apparatus 1 then is manipulated into cutting engagement with the stump, wherein leading cutting edges 19a engage and disintegrate stump material. Disintegration of the stump is continued as long as desired or until cutting edges 19a display dullness. If cutting edges display dullness, motor 3 is stopped and cutting wheel 11 ceases to rotate. Cutting wheel then is removed from the shaft of stump-grinding apparatus 1, is reversed relative to the shaft, and is replaced upon the shaft, wherein trailing cutting edges 19b are transposed with leading cutting edges 19a.

An entirely new and fresh set of cutting edges 19b then is presented for cutting engagement with the stump, and disintegration of the stump may be recommenced as discussed above. Of course, the same transposition of cutting edges 19a, 19b may be obtained by removal and reversal of each individual cutting tooth 19 relative to its cutting tooth boss 21, but such an operation clearly is clumsier and more time-consuming than simple reversal of entire wheel 11.

The improved cutting wheel for stump-grinding apparatus according to the present invention has a number of advantages. One advantage is that the wheel may be reversed relative to the stump-grinding apparatus, which transposes leading and trailing cutting edges to effectively double the cutting life of the wheel before resharpening or replacement of the cutting wheel is necessary. Another advantage is that the offset teeth of the wheel cut a wider kerf in the stump, increasing the cutting efficiency of the wheel and reducing cutting time. Yet another advantage of the present invention is that the presence of lightening holes and pitched cutting teeth smooths the cutting operation of the wheel, yielding a safer and more easily manipulated stump-grinding apparatus.

The present invention is described herein with reference to a preferred embodiment thereof. Those skilled in the art will appreciate that it is thus not limited, but is susceptible to variation and modification without departure from the scope and spirit of the invention.

I claim:

1. A cutting wheel for use in a stump-grinding apparatus, the cutting wheel comprising:

a disk having an outer diameter;

at least one cutting tooth secured to the outer diameter of the disk, each cutting tooth having a leading cutting edge and a generally opposite trailing cutting edge, and each cutting tooth being removable and reversible relative to the disk, wherein the trailing cutting edge is transposed with the leading cutting edge; and each cutting tooth being provided with a pitch wherein the leading cutting edge of the cutting tooth is elevated relative to the trailing cutting edge of the cutting tooth.

2. The cutting wheel according to claim 1 further comprising at least one cutting tooth boss secured between the cutting tooth and the disk.

3. The cutting wheel according to claim 1 wherein the disk has a central plane normal to its axis of rotation and a first cutting tooth is secured to the outer diameter of the reversible disk offset to one side of the central plane, a second cutting tooth is secured to the outer diameter of the disk generally in alignment with the central plane, and a third cutting tooth is secured to the outer diameter of the reversible disk offset to another and opposite side of the central plane.

4. The cutting wheel according to claim 1 wherein the disk is provided with a plurality of circumferentially spaced holes formed intermediate the generally noncircular hole and the outer diameter, the plurality of holes to reduce the mass of the cutting wheel and to reduce its rigidity, wherein vibration of the cutting wheel during cutting operation is dampened.

5. A cutting wheel for use in a stump-grinding apparatus, the cutting wheel comprising:

a disk having an outer diameter;

at least one cutting tooth boss secured to the outer diameter of the disk, the cutting tooth boss having a cutting tooth mounting surface;

at least one cutting tooth having a leading cutting edge and a generally opposite trailing cutting edge, the cutting tooth secured to the cutting tooth mounting surface of the cutting tooth boss and being removable and reversible relative to the disk, wherein the leading cutting edge and trailing cutting edge are transposed; and the cutting tooth boss being formed with an inclined cutting tooth mounting surface wherein the cutting tooth mounted thereon is provided with a pitch in which the leading cutting edge is elevated relative to the trailing cutting edge.

6. The cutting wheel according to claim 1 wherein the disk has a central plane normal to its axis of rotation and the a first cutting tooth boss and cutting tooth are secured to the outer diameter of the reversible disk offset to one side of the central plane, a second cutting tooth boss and cutting tooth boss are secured to the outer diameter of the disk generally in alignment with the central plane, and a third cutting tooth boss and cutting tooth are are secured to the outer diameter of the reversible disk offset to another and opposite side of the central plane.

7. The cutting wheel according to claim 5 wherein the disk is provided with a plurality of circumferentially spaced holes formed intermediate the generally noncircular hole and the outer diameter, the plurality of holes to reduce the mass of the cutting wheel and to reduce its rigidity, wherein vibration of the cutting wheel during cutting operation is dampened.

8. A cutting wheel for use in a stump-grinding apparatus, the cutting wheel comprising:

a reversible disk having an outer diameter;

a generally noncircular hole through a center of the reversible disk to register with a correspondingly generally noncircular shaft of the stump-grinding apparatus to transfer torque and rotation from the generally noncircular shaft to the reversible disk;

at least one cutting tooth boss secured to the ourter diammeter of the disk, the cutting tooth boss having a cutting tooth mounting surface;

at least one cutting tooth having a leading cutting edge and a generally opposite trailing cutting edge, the cutting tooth releasably secured to the cutting tooth mounting surface of the cutting tooth boss, the cutting tooth being removable from the reversible disk and reversible relative thereto, wherein the leading cutting edge and the trailing cutting edge may be transposed selectively; and the generally noncircular hole being formed to permit removal of the reversible disk from the generally noncircular shaft, subsequent reversal and replacement of the cutting wheel upon the generally noncircular shaft, wherein the trailing cutting edge of the cutting tooth and the leading edge of the cutting tooth are transposed.

9. The cutting wheel according to claim 8 wherein the cutting tooth mounting surface of the cutting tooth boss is inclined to elevate the leading cutting edge of the cutting tooth relative to the trailing cutting edge.

10. The cutting wheel according to claim 8 wherein the reversible disk is provided with a plurality of circumferentially spaced holes formed intermediate the generally noncircular hole and the outer diameter, the plurality of holes to reduce the mass of the cutting wheel and to reduce its rigidity, wherein vibration of the cutting wheel during cutting operation is dampened.

* * * * *